(12) United States Patent
Sakai et al.

(10) Patent No.: US 7,918,302 B2
(45) Date of Patent: Apr. 5, 2011

(54) SEAT APPARATUS

(75) Inventors: Morio Sakai, Toyota (JP); Toshiro Maeda, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 158 days.

(21) Appl. No.: 12/395,858

(22) Filed: Mar. 2, 2009

(65) Prior Publication Data

US 2009/0243353 A1 Oct. 1, 2009

(30) Foreign Application Priority Data

Mar. 25, 2008 (JP) ................. 2008-078250

(51) Int. Cl.
*B60K 28/14* (2006.01)
*B60N 2/42* (2006.01)

(52) U.S. Cl. .............. 180/274; 180/282; 297/216.13

(58) Field of Classification Search .......... 180/274, 180/282; 297/216.1, 216.13, 216.15, 216.19, 297/216.14; 701/45

See application file for complete search history.

(56) References Cited

U.S. PATENT DOCUMENTS

| | | | | |
|---|---|---|---|---|
| 5,103,691 A * | 4/1992 | Periou | ................. | 74/665 GD |
| 5,203,600 A * | 4/1993 | Watanabe et al. | ............. | 296/68.1 |
| 5,748,473 A * | 5/1998 | Breed et al. | .............. | 701/45 |
| 5,810,417 A * | 9/1998 | Jesadanont | ................. | 296/68.1 |
| 6,022,074 A * | 2/2000 | Swedenklef | ............. | 297/216.14 |
| 6,076,887 A * | 6/2000 | Andersson | ................. | 297/216.1 |
| 6,109,692 A * | 8/2000 | H.ang.land et al. | ...... | 297/216.18 |
| 6,244,656 B1 * | 6/2001 | Mueller | ............. | 297/216.13 |
| 6,296,306 B1 * | 10/2001 | Specht et al. | ............ | 297/216.14 |
| 6,629,575 B2 * | 10/2003 | Nikolov | .............. | 180/282 |
| 6,666,292 B2 | 12/2003 | Takagi et al. | | |
| 7,051,830 B2 * | 5/2006 | Enomoto | ................. | 180/274 |
| 7,200,474 B2 * | 4/2007 | Motozawa et al. | ............. | 701/45 |
| 7,216,931 B2 * | 5/2007 | Friedman | ................. | 297/216.1 |
| 7,229,133 B2 * | 6/2007 | Maddelein et al. | ...... | 297/362.13 |
| 7,278,682 B2 * | 10/2007 | Friedman et al. | ........... | 297/216.1 |
| 7,479,749 B2 * | 1/2009 | Gerding et al. | ............... | 318/469 |
| 7,604,081 B2 * | 10/2009 | Ootani et al. | ................. | 180/282 |
| 7,695,058 B2 * | 4/2010 | Satta et al. | ................. | 297/15 |
| 2005/0071053 A1 * | 3/2005 | Yamada et al. | ................. | 701/1 |
| 2006/0001298 A1 * | 1/2006 | Tsuruta et al. | ........... | 297/216.16 |
| 2006/0220426 A1 * | 10/2006 | Moffatt et al. | ........... | 297/216.19 |
| 2009/0284062 A1 * | 11/2009 | Sakai et al. | ................. | 297/354.1 |
| 2010/0066137 A1 * | 3/2010 | Sakai et al. | ................. | 297/217.3 |

FOREIGN PATENT DOCUMENTS

| | | |
|---|---|---|
| JP | 2001-322532 | 11/2001 |
| JP | 2007-500650 | 1/2007 |

\* cited by examiner

*Primary Examiner* — Paul N Dickson
*Assistant Examiner* — Laura Freedman
(74) *Attorney, Agent, or Firm* — Oblon, Spivak, McClelland, Maier & Neustadt, L.L.P.

(57) ABSTRACT

A seat apparatus includes a seat adapted to be arranged on a floor of a vehicle, a motor driving the seat to move, and a control unit supplying electric power to the motor by controlling a duty ratio with duty cycle control. The control unit determines an initial start-up time in which the duty ratio is defined as a first duty ratio over a period between the time the motor is started up after being powered by the control unit and the time before the seat driven by the motor starts moving. The control unit reduces the duty ratio when the initial start-up time elapses and sets the duty ratio to a second duty ratio smaller than the first duty ratio when the seat starts moving.

12 Claims, 4 Drawing Sheets

SEAT APPARATUS

CROSS REFERENCE TO RELATED APPLICATIONS

This application is based on and claims priority under 35 U.S.C. §119 to Japanese Patent Application 2008-078250, filed on Mar. 25, 2008, the entire content of which is incorporated herein by reference.

FIELD OF THE INVENTION

The present invention relates to a seat apparatus including a position adjustable seat for a vehicle, a motor driving the seat to move, and a control unit supplying electric power to the motor by controlling a duty ratio with duty cycle control.

BACKGROUND

A conventional passenger protection system for a vehicle disclosed in JP2007-500650A includes a seat apparatus having a motor and a control unit controlling operation of the motor. The motor drives a seat to move so that a position of the seat is adjusted. When a position of the seat is normally adjusted in the seat apparatus, the seat is moved at a first speed. In urgent cases where a vehicle may collide with an obstacle, the seat is moved at a second speed, which is higher than the first speed so that a position of the seat is quickly adjusted in order to protect a passenger of the vehicle from an impact due to the collision. In this way, when a position of the seat is normally adjusted in consideration for comfort and easiness of the seat position adjustment for the passenger, the motor is controlled so that the seat is actuated at a relatively low speed.

According to the conventional passenger protection system, when the seat driven by the motor starts moving, the motor may require a large driving force due to an effect of friction between gears arranged in a seat actuating mechanism and an effect of hardening of grease applied to the gears. On the other hand, when the seat is normally moved in order to change a position of the seat, the motor is controlled so that the seat is moved at a low speed. Accordingly, the seat is not moved and an operating speed of the seat is extremely reduced because of an insufficient driving force of the motor.

A need thus exists for a seat apparatus, which is not susceptible to the drawback mentioned above.

SUMMARY OF THE INVENTION

According to an aspect of the present invention, a seat apparatus includes a seat adapted to be arranged on a floor of a vehicle, a motor driving the seat to move, and a control unit supplying electric power to the motor by controlling a duty ratio with duty cycle control. The control unit determines an initial start-up time in which the duty ratio is defined as a first duty ratio over a period between the time the motor is started up after being powered by the control unit and the time before the seat driven by the motor starts moving. The control unit reduces the duty ratio when the initial start-up time elapses and sets the duty ratio to a second duty ratio smaller than the first duty ratio when the seat starts moving.

BRIEF DESCRIPTION OF THE DRAWINGS

The foregoing and additional features and characteristics of the present invention will become more apparent from the following detailed description considered with reference to the accompanying figures, wherein.

DETAILED DESCRIPTION

Figure 1:
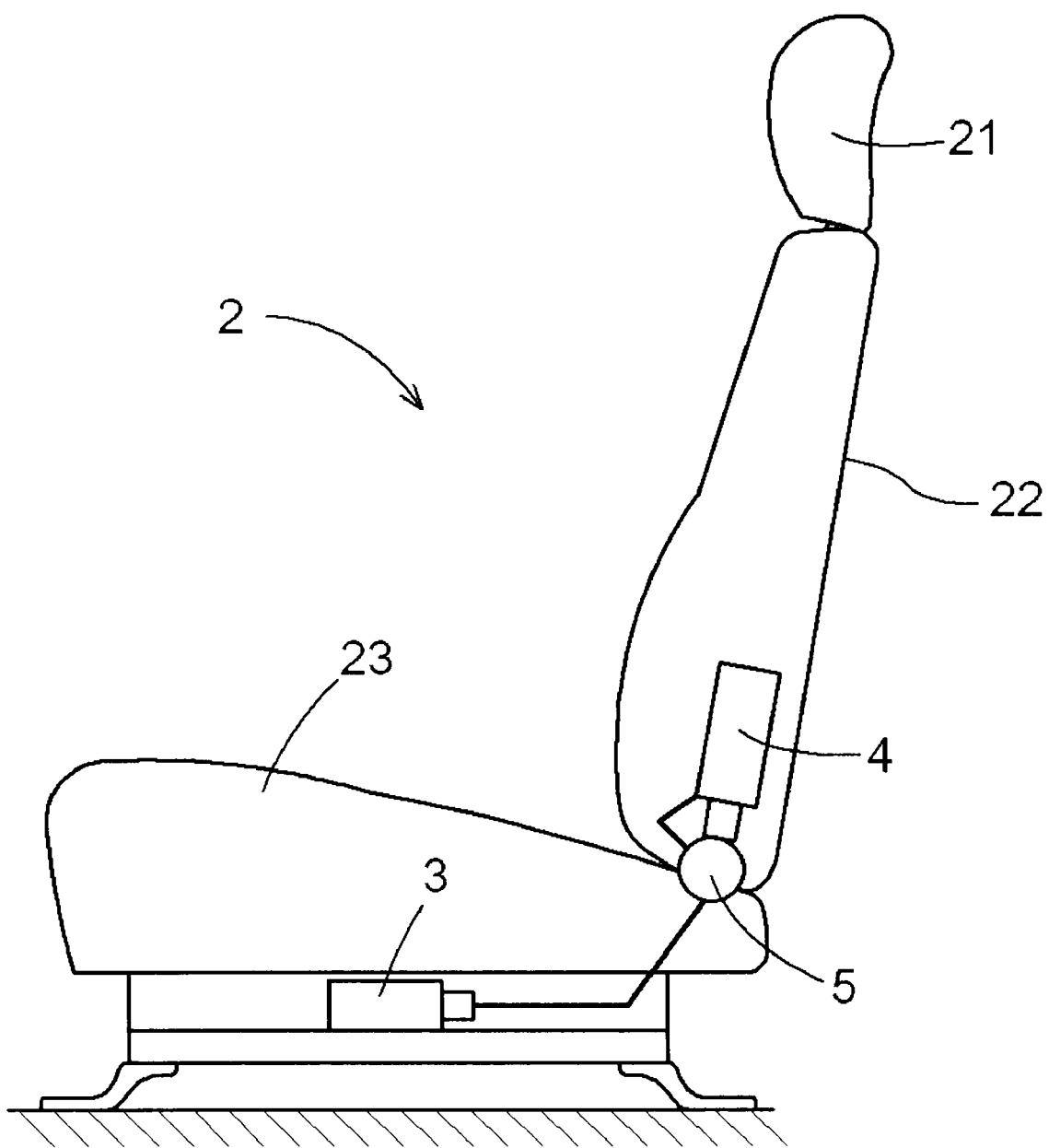
FIG. 1 is a schematic view illustrating a seat apparatus according to an embodiment of the present invention.
Figure 2:
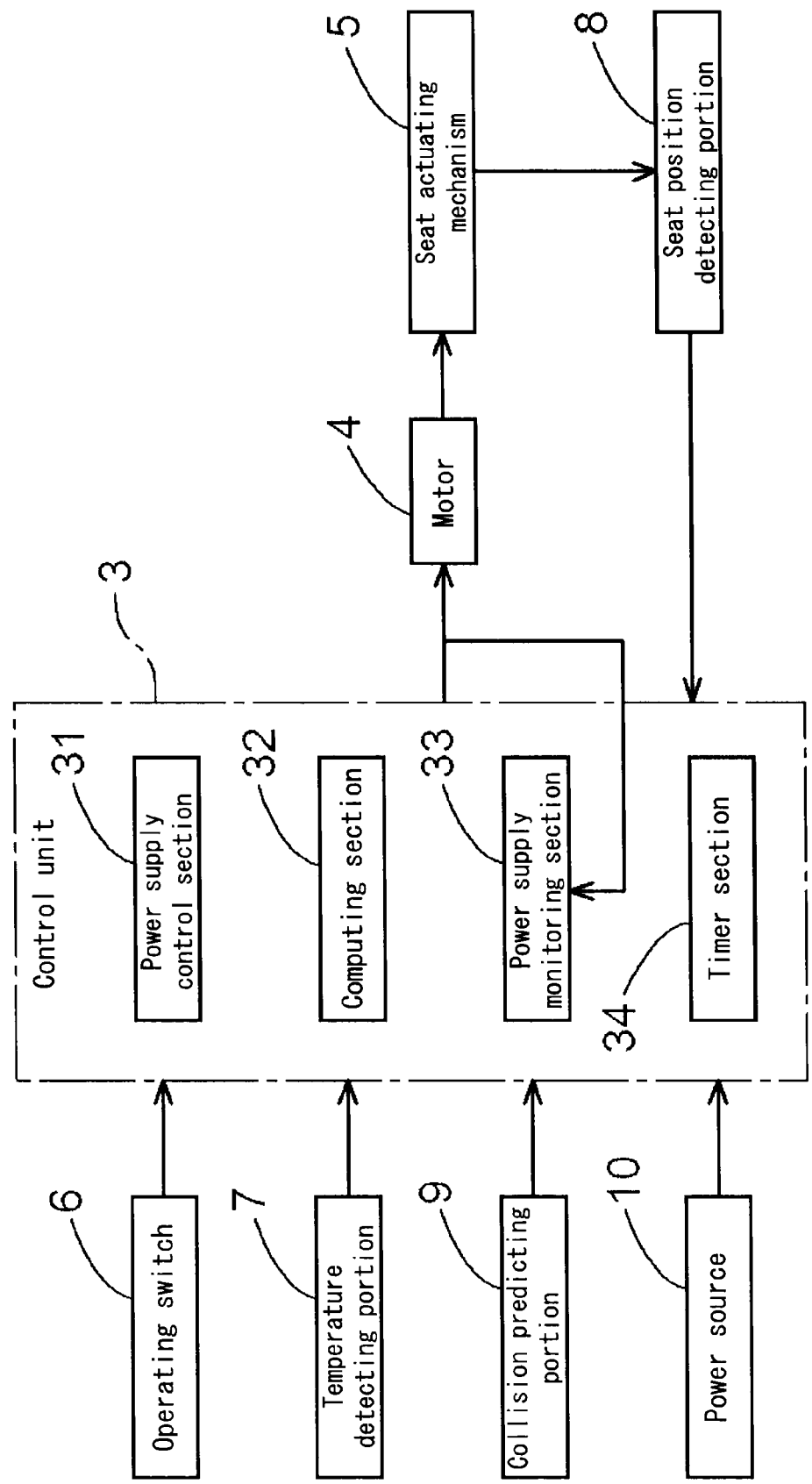
FIG. 2 is a functional block diagram schematically illustrating the seat apparatus according to the embodiment of the present invention.

An embodiment of the present invention will be explained with reference to the illustrations of the figures as follows. FIG. 1 is a schematic view illustrating a seat apparatus according to the embodiment. Further, FIG. 2 is a functional block diagram schematically illustrating the seat apparatus of the embodiment. As shown in FIGS. 1 and 2, the seat apparatus includes a seat 2 adapted to be arranged on a floor of a vehicle, an operating switch 6 commanding the seat 2 to and not to move, a control unit 3 controlling the movement of the seat 2, a motor 4 driving the seat 2, and a seat actuating mechanism 5 transmitting a driving force of the motor 4 to the seat 2.

When a passenger presses the operating switch 6 to activate the motor 4, the motor 4 drives the seat 2 to move, so that a position of the seat 2 is adjusted. Accordingly, the passenger adjusts a position of the seat 2 to a desired position according to the activation of the operating switch 6 pressed by the passenger. In addition, when a collision of the vehicle with an obstacle may occur, the seat apparatus actuates the seat 2 to be adjusted to a predetermined position for protecting a passenger of the vehicle.

In the seat apparatus according to the embodiment, when a passenger presses the operating switch 6 in order to adjust a position of the seat 2, the seat 2 is moved at a first speed, which is a relatively low speed, in consideration for comfort and easiness of the seat position adjustment for the passenger. Meanwhile, in the case of a seat position adjusting operation of the seat 2 when a collision of the vehicle with an obstacle may occur, the seat 2 is moved at a second speed, which is higher than the first speed, in order to quickly change a position of the seat 2 to a target position.

The seat 2 includes a headrest 21, a seat back 22, and a seat cushion 23. The seat back 22 is attached to the seat cushion 23 via a predetermined supporting point. The seat 2 is driven by the motor 4 so as to move, thereby adjusting a tilt angle of the seat back 22. In the seat apparatus of the embodiment, the seat position adjusting operation of the seat 2 will be explained by applying an example of a tilt angle adjusting operation (reclining operation) of the seat back 22.

Figure 5:
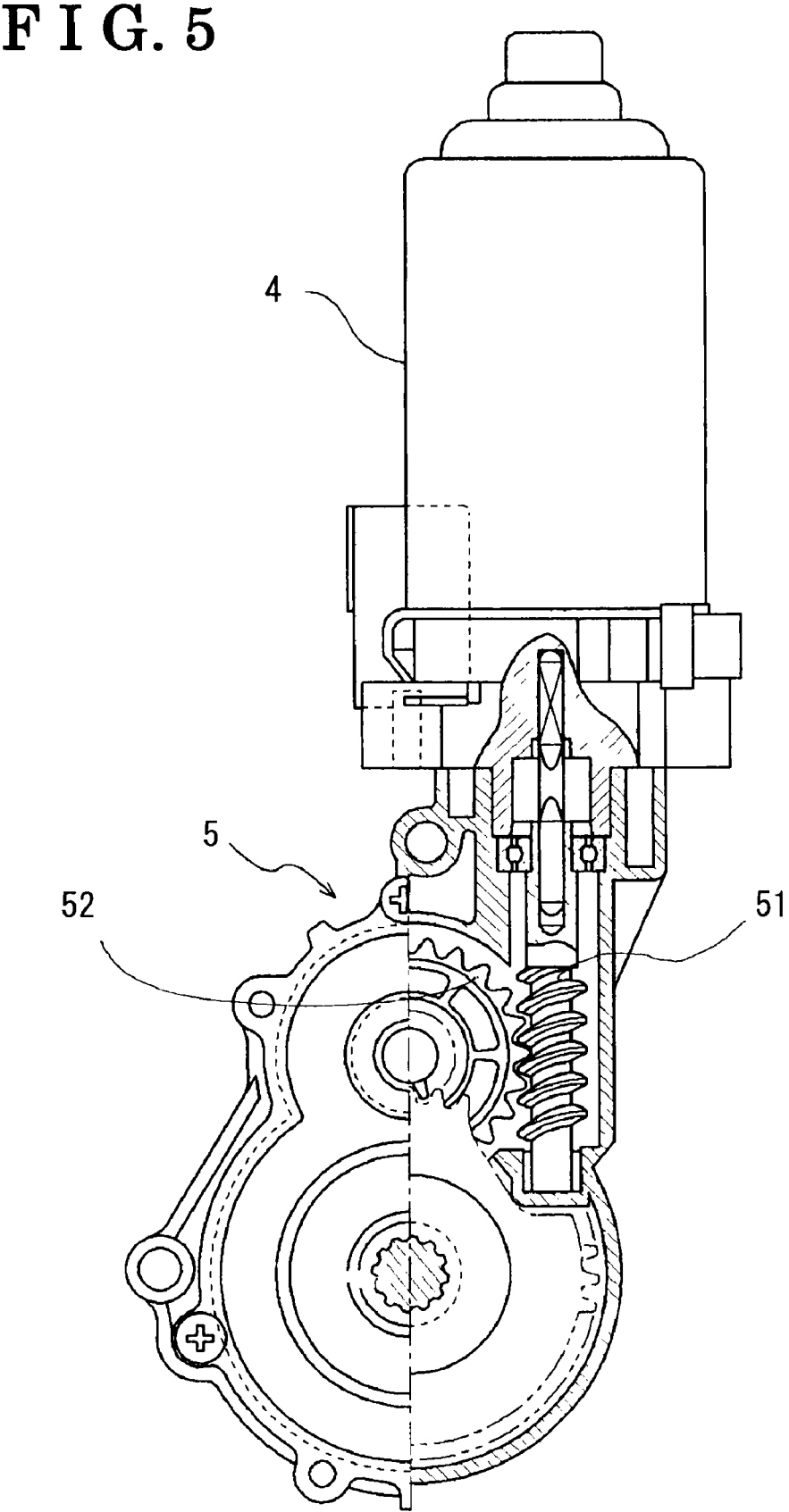
FIG. 5 is a partially cutaway side view of a seat actuating mechanism.

The control unit 3 includes a power supply control section 31 controlling an electric power supply from a power source 10 to the motor 4 by means of duty cycle control, a computing section 32 processing various computations, a power supply monitoring section 33 monitoring conditions of the electric power supply from the power source 10 to the motor 4, and a timer section 34 timing a power supplying time from the power source 10 to the motor 4 and a power supply stop time. Furthermore, a collision predicting sensor 9 predicting a collision between the vehicle and an obstacle is connected to the control unit 3. The collision predicting sensor 9 is configured by applying, for example, a millimeter wave radar detecting an obstacle existing around the vehicle or an image recognition system. A signal output from the collision predicting sensor 9 is input to the control unit 3. In the control unit 3, information such as a distance from the vehicle to the obstacle and a relative speed to the obstacle is computed in accordance with the output signal from the collision predicting sensor 9. Accordingly, the possibility of occurrence of a collision of the vehicle with an obstacle is determined in accordance with the information under predetermined judgment conditions, The seat actuating mechanism 5 including a pair of gear portions 51 and 52 (see FIG. 5) is configured so as to convert a driving force of the motor 4 and transmit the converted driving force to the seat 2. The gear potions 51 and 52 serve as a worm shaft and a worm wheel, respectively. The worm shaft is driven by the motor 4 so as to rotate. The worm wheel engages with the worm shaft. The configuration of the seat actuating mechanism 5 is known, and therefore the detailed explanation will be omitted. A seat position detecting portion 8 is additionally arranged in the seat actuating mechanism 5. The seat position detecting portion 8 detects a tilt angle of the seat back 22. An angle meter such as a potentiometer and a rotary encoder may be applied as the seat position detecting portion 8. Furthermore, a temperature detecting portion 7 detecting a temperature of the seat actuating mechanism 5 is arranged within or near the seat actuating mechanism 5. A known temperature sensor may be applied as the temperature detection portion 7. The seat position detecting portion 8 and the temperature detecting portion 7 are connected to the control unit 3. Accordingly, detection results of the seat position detecting portion 8 and the temperature detecting portion 8 are input in the control unit 3.

(Seat Position Adjusting Operation of the Seat 2 Being Normally Moved)

Next, the seat position adjusting operation of the seat 2 being normally moved will be explained as follows. When a passenger presses the operating switch 6 and the seat 2 is normally moved, a position of the seat 2 is adjusted. At this time, the seat 2 is moved at the first speed that is relatively low so that the passenger can adjust a position of the seat 2 comfortably and easily. The power supply control section 31 controls the electric power supply from the power source 10 to the motor 4 by the duty cycle control, thereby controlling an operating speed of the seat 2.

The duty cycle control of the power supply control section 31 when a position of the seat 2 is adjusted in accordance with the seat position adjusting operation of the seat 2 being normally moved will be described as follows. As explained above, when a position of the seat 2 is normally adjusted, the seat 2 is moved at the first speed that is relatively low. In this case, the power source 10 supplies electric power to the motor 4 at a relatively small duty ratio. Meanwhile, when the seat 2 driven by the motor 4 starts moving, the motor 4 requires a large driving force for driving the seat 2 due to an effect of friction between the gear portions 51 and 52 and an effect of hardening of grease applied to the gear portions 51 and 52. Accordingly, when the power source 10 supplies electric power to the motor 4 at a duty ratio corresponding to the first speed, a driving force of the motor 4 is insufficient to drive the seat 2. Consequently, the seat 2 may not be appropriately moved. In addition, a duty ratio is referred to as a ratio of an energization time in milliseconds relative to a period of time in milliseconds during one cycle.

Thus, the power supply control section 31 determines an initial start-up time during a period of time after the power source 10 supplies electric power to the motor 4 and before the seat 2 starts moving. A first duty ratio, which is larger than the duty ratio corresponding to the first speed, is set in the initial start-up time. The duty ratio corresponding to the first speed is a second duty ratio described below. Further, the power supply control section 31 reduces a duty ratio when the initial start-up time elapses. In addition, when the seat 2 driven by the motor 4 starts moving, the power supply control section 31 controls the duty ratio to be the second duty ratio that is smaller than the first duty ratio. Here, the seat 2 is not actually moved because the initial start-up time is set in consideration for friction between the gear potions 51 and 52 that are included in the seat actuating mechanism 5. However, the initial start-up time is set at a value, at which the seat 2 is surely moved after the initial start-up time elapses.

In the embodiment, the initial stat-up time is set in accordance with a detection result of the temperature detecting portion 7. That is, as described above, the effect of the friction between the gear portions 51 and 52 and the effect of the hardening of grease applied to the gear portions 51 and 52 are expected to cause the motor 4 to require a large driving force when the motor 4 is activated. The degree of the hardening of grease varies depending on an ambient temperature of the motor 4. Accordingly, in the embodiment, when the temperature detecting portion 7 detects a high ambient temperature around the motor 4, the initial start-up time is set short. Meanwhile, when the temperature detecting portion 7 detects a low ambient temperature around the motor 4, the initial start-up time is set to be longer.

Figure 3:
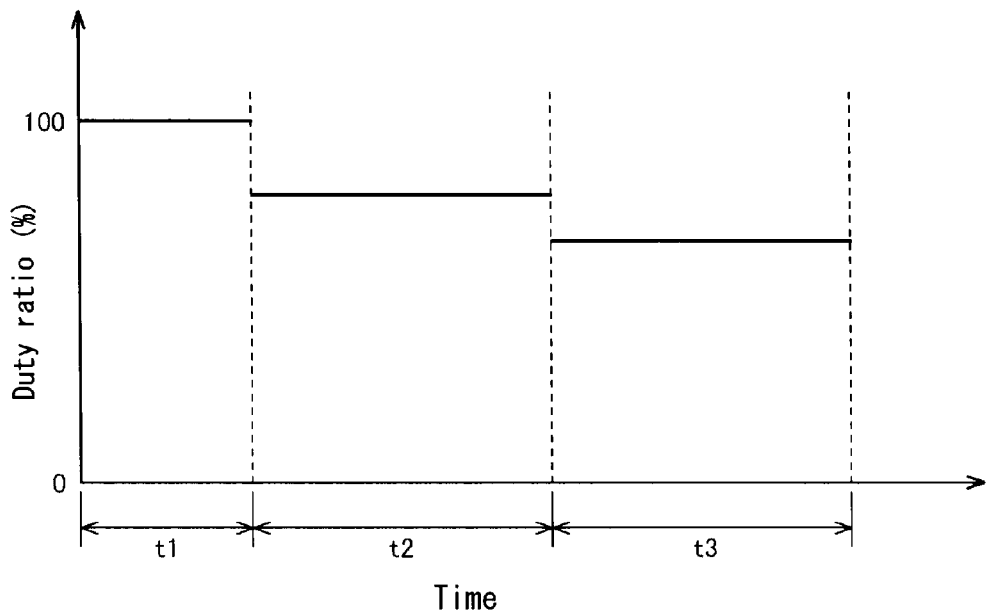
FIG. 3 is a chart illustrating an example of duty cycle control.

FIG. 3 is a chart illustrating an example of duty cycle control of the power supply control section 31 when a position of the seat 2 is normally adjusted. In FIG. 3, a transverse axis shows a period of time elapsed after the motor 4 is activated and a vertical axis shows a duty ratio of electric power supplied from the power source 10 to the motor 4. In the example of the FIG. 3, the initial start-up time during a period of time between the time when the power source 10 starts supplying electric power to the motor 4 and the time right before the seat 2 starts moving is set as "t1". The first duty ratio is set at 100 percent over a whole period of the initial start-up time.

A duty ratio is controlled so as to be 100 percent during the initial start-up time "t1" from the time when the power source 10 starts supplying electric power to the motor 4 to the time right before the motor 4 is activated. After the initial start-up time "t1" elapses, a duty ratio is controlled so as to be the second duty ratio that is smaller than 100 percent. In the embodiment, the duty ratio is controlled during a period of time after the initial start-up time "t1" and before Time "t2" elapses so that the electric power supplied to the motor 4 reaches a predetermined electric power required for normally actuating the seat 2. After Time "t2" elapses, the duty ratio is controlled, for example, by feedback control, in accordance with a detection result of the seat position detecting portion 8 so that the seat 2 is moved at the first speed during Time "t3". In addition, the first duty ratio may not necessarily be 100 percent and may be set at a value at which the seat 2 is surely moved.

Moreover, the initial start-up time is not necessarily set so as to last until just before the seat 2 starts moving. The initial start-up time is a period of time when electric power is supplied to the motor 4 at the first duty ratio. After the initial start-up time elapses, it is necessary to decrease a duty ratio down to the second duty ratio for actually moving the seat 2. Accordingly, the initial start-up time is specifically a period of time from the time when the power source 10 starts supplying electric power to the motor 4 at the first duty ratio to the time when the first duty ratio starts decreasing. Thereafter, the duty ratio is decreased down to the second duty ratio when the seat 2 starts moving. At this time, the timing when the initial start-up time ends does not necessarily equate to the timing when the seat 2 starts moving.

As described above, when the motor 4 is activated, electric power is supplied to the motor 4 at a duty ratio of 100 percent, thereby surely driving and moving the seat 2 by means of a large driving force of the motor 4. Meanwhile, when the seat 2 starts moving, the duty ratio is set at a value lower than 100 percent. Accordingly, vibrations of the seat 2, which may occur when the seat 2 is suddenly actuated or when a duty ratio is suddenly changed after the seat 2 starts moving, are reduced. Consequently, the seat 2 is surely actuated without deteriorating comfort of a passenger of the vehicle.

(Seat Position Adjusting Operation of the Seat 2 in Case of Emergencies)

A seat position adjusting operation of the seat 2 in case of emergencies will be described as follows. In emergency cases where the vehicle may collide with an obstacle, the control unit 3 controls movement of the seat back 22 so that a position of the seat 2 is adjusted to a predetermined position for the purpose of the passenger protection from the collision. A collision is predicted by the information on a distance between the vehicle to the obstacle and the relative speed to the obstacle that are computed in accordance with a detection result of the collision predicting sensor 9 included in the vehicle. When the collision predicting sensor 9 determines that a collision of the vehicle with an obstacle may occur, the seat back 22 is moved so that a position of the passenger is changed to an appropriate position. At this time, a position of the seat 2 is determined in accordance with the configuration of the vehicle or in accordance with a speed of the vehicle when a collision of the vehicle with an obstacle may occur.

In emergency cases where a collision of the vehicle with an obstacle may occur, a position of the seat 2 is quickly changed to an appropriate position. Accordingly, the power supply control section 31 distributes the electric power of the power source 10 to the motor 4 so that a duty ratio is larger than the second duty ratio at which the seat 2 is normally moved. For example, the duty ratio is set at 100 percent in the same way as the aforementioned first duty ratio. Accordingly, the seat back 22 is moved at the second speed higher than the first speed so that a position of the seat 2 is quickly adjusted to a target position.

(Operation of A Motor Protection Mechanism)

Further, the seat apparatus according to the embodiment includes the motor protection mechanism that protects the motor 4 by allowing or prohibiting the motor 4 to operate in accordance with an energization time and an energization voltage for the motor 4. Even when a passenger presses the operating switch 6 under a condition where the motor 4 is prohibited to operate, the motor 4 is not energized, so that the motor 4 is not activated. Moreover, even while the passenger is pressing the operating switch 6, energization to the motor 4 is interrupted, thereby stopping operation of the motor 4. Operation of the motor protection mechanism will be explained below.

In the motor protection mechanism, the computing section 32 computes a thermal storage amount "Q" of the motor 4 in accordance with the energization time and the energization voltage for the motor 4. That is, the thermal storage amount "Q" is computed as a function of the energization voltage and the energization time. In particular, the computing section 32 computes an energization voltage in accordance with a voltage of the power source 10, a duty ratio, and an energization resistance of the motor 4 and obtains an energization time from the timer section 34. Accordingly, the thermal storage amount "Q" of the motor 4 is computed from the computed energization voltage and the obtained energization time. In addition, the computing section 32 processes a subtraction of the thermal storage amount "Q" in accordance with the stop time of the motor 4 after the stop time of the motor 4 continues for a predetermined threshold time or more.

In spite of whether or not a passenger presses the operating switch 6, when the thermal storage amount "Q" reaches a predetermine threshold "$Q_{TH}$", the power supply control section 31 interrupts energization to the motor 4 in accordance with the computed thermal storage amount "Q" and prohibits the motor 4 to operate. Meanwhile, when the thermal storage amount "Q" is smaller than the predetermine threshold "$Q_{TH}$", the power supply control section 31 allows the motor 4 to operate.

Figure 4:
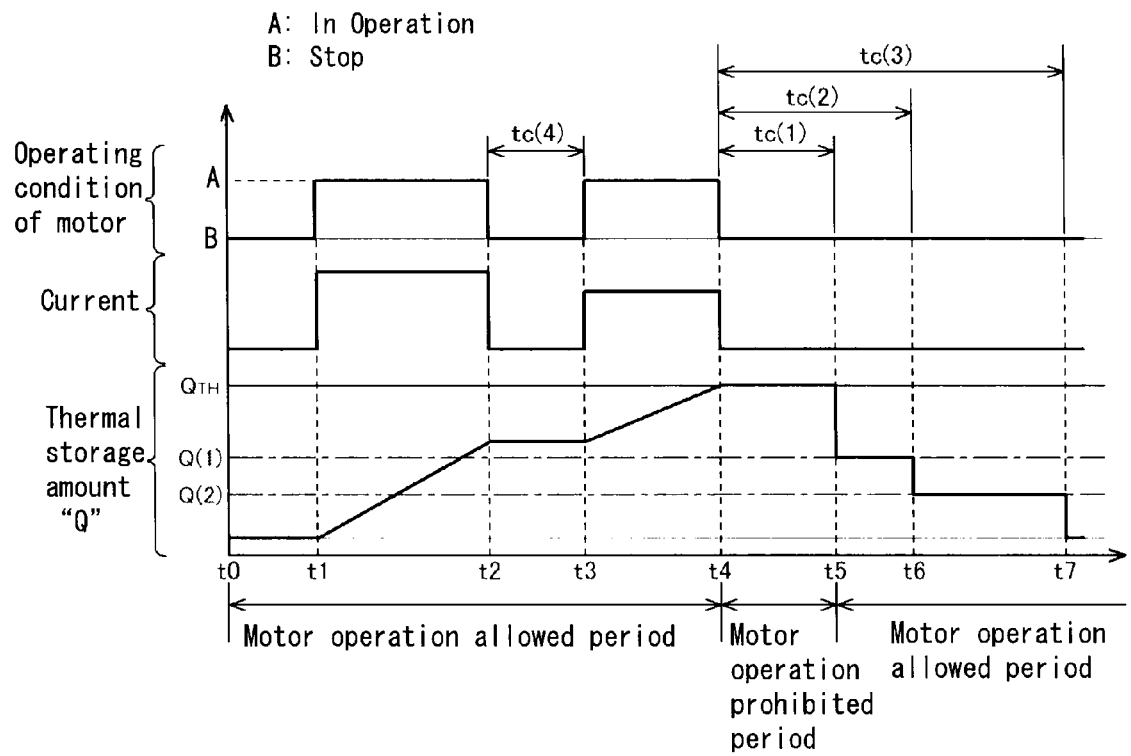
FIG. 4 is a chart illustrating an example of operation of a motor protection mechanism.

FIG. 4 is a chart illustrating an example of the operation of the motor protection mechanism. In FIG. 4, the upper section shows whether or not the motor 4 is in operation. In the example of FIG. 4, the motor 4 is in operation during the period of time between the initial start-up time "t1" and Time "t2". Thereafter, the operation of the motor 4 is stopped during the period of time between Time "t2" and Time "t3". Afterward, the motor 4 is in operation during the period of time between Time "t3" and Time "t4". After Time "t4" elapses, the operation of the motor 4 is stopped. Moreover, the middle section of FIG. 4 shows time variations of a current value at which the motor 4 is energized. In the example, the motor 4 is energized during the period of time between the initial start-up time "t1" and Time "t2" and during the period of time between Time "t3" and Time "t4". The lower section of FIG. 4 shows the thermal storage amount "Q" that is computed by the computing section 32, and illustrates whether or not the motor 4 is allowed to operate.

In the example shown in FIG. 4, the thermal storage amount "Q" increases during the period of the time between the initial start-up time "t1" and Time "t2" because the motor 4 is in operation in the mean time. Thereafter, the thermal storage amount "Q" stops increasing during the period of time between Time "t2" and Time "t3" because the operation of the motor 4 is stopped in the mean time. Meanwhile, the computing section 32 does not process the subtraction of the thermal storage amount "Q" during the period of time between Time "t2" and Time "t3" because a stop time "tc(4)" of the motor 4 is smaller than the a predetermined threshold value (referred to as a stop time "tc(1)" of the motor 4, which is described below), which is set as a threshold used in the case of the subtraction of the thermal storage amount "Q". After Time "t3" elapses, the thermal storage amount "Q" increases during the period of time between Time "t3" and Time "t4" because the motor 4 is in operation in the meantime. Thereafter, at Time "t4", the thermal storage amount "Q" reaches the threshold "$Q_{TH}$" for prohibiting the operation of the motor 4. Accordingly, even when a passenger presses the operating switch 6 at Time "t4", energization to the motor 4 is interrupted, thereby stopping the operation of the motor 4.

When the stop time of the motor 4 reaches the predetermined threshold value "tc(1) after the operation of the motor 4 is stopped, the thermal storage amount "Q" is subtracted to the value "Q(1)" corresponding to the stop time "tc(1)" of the motor 4 (at Time "t51"). At this time, the thermal storage amount "Q" becomes smaller than the threshold "$Q_{TH}$", thereafter newly activating the motor 4. Further, when the stop time of the motor 4 reaches a predetermined threshold "tc(2)" referred to as a stop time of the motor 4, the thermal storage amount "Q" is subtracted to a value "Q(2)" corresponding to the stop time "tc(2)" of the motor 4 (at Time "t6"). Moreover, when the stop time of the motor 4 reaches a predetermined threshold "tc(3)" referred to as a stop time of the motor 4, the thermal storage amount "Q" is reduced to zero. In addition, the subtraction mode of the thermal storage amount "Q" is not limited to the aforementioned examples. For example, the thermal storage amount "Q" may be subtracted by a predetermined thermal storage amount corresponding to each of the stop time "tc(1)", "tc(2)", and "tc(3)" of the motor 4, In addition, even when the thermal storage amount "Q" reaches the threshold "$Q_{TH}$", the seat position adjusting operation of the seat 2 is conducted while the motor 4 is not prohibited to operate in case of emergencies where a collision of the vehicle with an obstacle may occur.

In the aforementioned embodiment, the seat position adjusting operation of the seat 2 is explained by applying the example of the reclining operation of the seat back 22 but may not be limited to the reclining operation. For example, the seat position adjusting operation may be applied to a different operation such as a sliding operation of the seat cushion 23.

In the aforementioned embodiment, the initial start-up time is a period of time from the time when the power source 10 starts supplying electric power to the motor 4 to the time right before the seat 2 is actuated. However, the initial start-up time is not limited to such period of time. The initial start-up time may be a period of time after the power source 10 starts supplying electric power to the motor 4 and before the seat 2 starts moving. The initial start-up time may not necessarily start from the time when the power source 10 starts supplying electric power to the motor 4 and may not necessarily continue until just before the seat 2 starts moving. In addition, the initial start-up time may not necessarily be determined in accordance with a detection result of the temperature detecting portion 7, In the aforementioned embodiment, a duty ratio when the seat 2 is quickly moved is not necessarily set at 100 percent. Moreover, the duty ratio is not necessarily equal to the first duty ratio. A duty ratio, which enables the seat 2 to quickly move to be adjusted to a target position, may be applied.

In the aforementioned embodiment, the motor protection mechanism included in the seat apparatus is not necessarily configured as described above. For example, the motor protection mechanism included in the seat apparatus may be a motor protection mechanism, which stops the operation of the motor 4 by detecting heat generation of the motor 4 using a thermistor.

As described above, when the seat 2 is actuated over a period of time between the time when the motor 4 is driven following the electric supply from the operating switch 6 to the motor 4 and the time before the seat 2 starts moving, electric power is supplied to the motor 4 at a duty ratio larger than a duty ratio when the seat 2 is in operation. Accordingly, a driving force required for starting up the motor 4 is obtained, so that the seat 2 is driven by the motor 4 so as to surely start moving. Meanwhile, a duty ratio when the seat 2 actually starts moving is set at a value, which is lower than a duty ratio before the movement of the seat 2 starts. Consequently, vibrations of the seat 2, which may occur when the seat 2 is suddenly actuated or when a duty ratio is suddenly changed after the seat 2 starts moving, are reduced. Thus, the seat 2 is surely actuated while comfort of a passenger of the vehicle is not deteriorated.

According to the aforementioned embodiment, the control unit 3 sets the duty ratio to the first duty ratio when starting supplying electric power to the motor 4.

The driving force required for starting up the motor 4 is promptly obtained by supplying electric power to the motor 4 at a large duty ratio from the timing when the motor 4 is activated. Accordingly, the seat 2 is quickly actuated.

According to the aforementioned embodiment, the seat apparatus includes the temperature detecting portion 7 detecting an ambient temperature near the seat 2. Further, the control unit 3 determines the initial start-up time in accordance with a detection result of the temperature detecting portion 7.

Accordingly, the effect of the friction between the gear portions 51 and 52 and the effect of the hardening of grease applied to the gear portions 51 and 52 are expected to cause the motor 4 to require a large driving force when the motor 4 is activated. The degree of the hardening of grease varies depending on an ambient temperature of the motor 4, thereby varying a driving force required for starting up the motor 4. Accordingly, the initial start-up time is appropriately set by considering for the ambient temperature near the motor 4.

Further, according to the aforementioned embodiment, the seat 2 includes the seat cushion 23 and the seat back 22. A tilt angle of the seat back 22 relative to the seat cushion 23 is adjusted when the control unit 3 supplies electric power to the motor 4 to be driven and then a driving force of the motor 4 is transmitted to the seat actuating mechanism 5 arranged between the seat cushion 23 and the seat back 22 and transmitting the driving force to the seat 2.

Furthermore, according to the aforementioned embodiment, the seat apparatus includes the seat position detecting portion 8. Accordingly, the tilt angle of the seat back 22 relative to the seat cushion 23 is detected by the seat position detecting portion 8.

Further, according to the aforementioned embodiment, the seat actuating mechanism 5 includes a pair of the gear portions 51 and 52 engaging with each other. In addition, grease is applied to the gear portions 51 and 52.

Moreover, according to the aforementioned embodiment, the gear portions 51 and 52 convert the driving force of the motor 4 and transmit the converted driving force to the seat 2.

Further, according to the aforementioned embodiment, the seat actuating mechanism 5 includes a pair of the gear portions 51 and 52 converting the driving force of the motor 4 and transmitting the converted driving force to the seat 2. Further, grease is applied to the gear portions 51 and 52, According to the aforementioned embodiment, the control unit 3 transmits the driving force of the motor 4 to the seat 2 via the seat actuating mechanism 5 only at a predetermined time.

According to the aforementioned embodiment, the predetermined time is a time when a collision of the vehicle with an obstacle is predicted by the collision predicting sensor 9.

Furthermore, according to the aforementioned embodiment, the seat 2 includes the seat cushion 23 and the seat back 22. In addition, the control unit 3 supplies electric power to the motor 4 to be driven and the driving force of the motor 4 is transmitted to the seat actuating mechanism 5 arranged between the seat cushion 23 and the seat back 22 and transmitting the driving force to the seat 2, thereby adjusting the tilt angle of the seat back 22 relative to the seat cushion 23.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus, comprising:
a seat adapted to be arranged on a floor of a vehicle;
a motor that drives the seat to move; and
a control unit that supplies electric power to the motor by controlling a duty ratio with duty cycle control, wherein the control unit determines an initial start-up time in which the duty ratio is defined as a first duty ratio over a period between a time the motor is started up after being powered by the control unit and a time before the seat driven by the motor starts moving, and the control unit reduces the duty ratio when the initial start-up time elapses and sets the duty ratio to a second duty ratio smaller than the first duty ratio when the seat starts moving.

2. The seat apparatus according to claim 1, wherein the control unit sets the duty ratio to the first duty ratio when starting supplying electric power to the motor.

3. The seat apparatus according to claim 1, further comprising a temperature detecting portion that detects an ambient temperature near the seat, wherein the control unit determines the initial start-up time in accordance with a detection result of the temperature detecting portion.

4. The seat apparatus according to claim 1, wherein the seat includes a seat cushion and a seat back, and a tilt angle of the seat back relative to the seat cushion is adjusted when the control unit supplies electric power to the motor to be driven and then a driving force of the motor is transmitted to a seat actuating mechanism arranged between the seat cushion and the seat back and the driving force is transmitted to the seat.

5. The seat apparatus according to claim 4, further comprising a seat position detecting portion, wherein the tilt angle of the seat back relative to the seat cushion is detected by the seat position detecting portion.

6. The seat apparatus according to claim 4, wherein the seat actuating mechanism includes a pair of gear portions that engage with each other, and grease is applied to the gear portions.

7. The seat apparatus according to claim 6, wherein the gear portions convert the driving force of the motor and transmit the converted driving force to the seat.

8. The seat apparatus according to claim 4, wherein the seat actuating mechanism includes a pair of gear portions that convert the driving force of the motor and that transmit the converted driving force to the seat, and grease is applied to the gear portions.

9. The seat apparatus according to claim 4, wherein the control unit transmits the driving force of the motor to the seat via the seat actuating mechanism only at a predetermined time.

10. The seat apparatus according to claim 9, wherein the predetermined time is a time when a collision of the vehicle with an obstacle is predicted by a collision predicting sensor.

11. A seat apparatus, comprising:
a seat adapted to be arranged on a floor of a vehicle;
a motor that drives the seat to move; and
a control unit that supplies electric power to the motor by controlling a duty ratio with duty cycle control to move the seat, wherein the control unit supplies electric power to the motor so that the duty ratio over a period of time between a time when the control unit starts supplying electric power to the motor and a time before the seat driven by the motor starts moving, is larger than the duty ratio after the seat starts moving.

12. The seat apparatus according to claim 11, wherein the seat includes a seat cushion and a seat back, and the control unit supplies electric power to the motor to be driven and the driving force of the motor is transmitted to a seat actuating mechanism arranged between the seat cushion and the seat back and transmits the driving force to the seat, thereby adjusting a tilt angle of the seat back relative to the seat cushion.

* * * * *